United States Patent

Aiyer et al.

[11] Patent Number: 5,838,448
[45] Date of Patent: *Nov. 17, 1998

[54] CMP VARIABLE ANGLE IN SITU SENSOR

[75] Inventors: Arun A. Aiyer, Fremont; Paul Derek Coon, Redwood City; Henry K. Chau, San Francisco, all of Calif.

[73] Assignee: Nikon Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 814,821

[22] Filed: Mar. 11, 1997

[51] Int. Cl.⁶ .................................................. G01B 11/06
[52] U.S. Cl. ........................... 356/382; 438/16; 438/692; 216/84; 356/357
[58] Field of Search ..................... 355/381, 382, 355/355, 357, 345; 438/8, 16, 692, 693, 14; 216/38, 84, 88; 324/671

[56] References Cited

U.S. PATENT DOCUMENTS

| | | | |
|---|---|---|---|
| 4,077,720 | 3/1978 | Kasai | 356/369 |
| 4,555,767 | 11/1985 | Case et al. | 356/381 |
| 4,660,980 | 4/1987 | Takabayashi et al. | 356/357 |
| 4,983,823 | 1/1991 | Isobe | 356/382 |
| 4,999,014 | 3/1991 | Gold et al. | 356/382 |
| 5,042,951 | 8/1991 | Gold et al. | 356/381 |
| 5,245,794 | 9/1993 | Salugsugan | 51/165.74 |
| 5,308,438 | 5/1994 | Cote et al. | 156/636 |
| 5,337,015 | 8/1994 | Lustig et al. | 324/671 |
| 5,408,322 | 4/1995 | Hsu et al. | 356/382 |
| 5,413,941 | 5/1995 | Koos et al. | 437/8 |
| 5,433,651 | 7/1995 | Lustig et al. | 451/6 |
| 5,499,733 | 3/1996 | Litvak | 216/38 |
| 5,503,962 | 4/1996 | Caldwell | 430/317 |
| 5,559,428 | 9/1996 | Li et al. | 324/71.5 |
| 5,646,734 | 7/1997 | Venkatesh et al. | 356/382 |

OTHER PUBLICATIONS

J.T. Fanton et al., "Multiparameter measurement sof thin films using beam–profile reflectometry", J. Appl. Phys. vol. 73, No. 11, 1 Jun. 1993, pp. 7035–7040.

*Primary Examiner*—Hoa Q. Pham
*Attorney, Agent, or Firm*—Skjerven, Morrill, MacPherson, Franklin & Friel LLP

[57] ABSTRACT

A chemical-mechanical polishing (CMP) optical process monitor apparatus allows in situ measurement of the thickness of a thin film being polished. As the incidence angle of the incident light on the wafer being polished is changed, the reflected intensity of the light from the thin film on the wafer undergoes a variation in local maxima and minima. The angle at which the light intensity is a maximum or minimum determined by the thin film interference equation, thus providing a measurement of the thin film thickness and/or the change in the thin film thickness.

26 Claims, 4 Drawing Sheets ial. U.S. Pat. No. 5,499,733. However this method only
CM P VARIABLE ANGLE IN SITU SENSOR

FIELD OF THE INVENTION

This invention relates to measuring thicknesses and changes in the thicknesses of thin films formed on semiconductor wafers or other substrates during CMP (chemical-mechanical polishing) and more specifically to optical measurement of such film thicknesses.

BACKGROUND OF THE INVENTION

Chemical-mechanical polishing (CMP) is a well known process used in semiconductor fabrication. CMP is typically used to planarize a surface, for instance a silicon dioxide ("oxide") film surface formed on a silicon wafer. The CMP process removes small elevated features without significantly thinning the oxide on for instance the flat areas. It is a well known problem to determine a planarization end point for a CMP process on a semiconductor wafer; see Lustig U.S. Pat. No. 5,433,651. In CMP, usually a slurry is fed between lapping (polishing) plates to remove and flush away unwanted film materials. Commercially available CMP machines are available which include a single rotating polishing plate and a smaller diameter rotating wafer carrier to which the wafer is attached. The wafer carrier is held above the polishing plate, either in a stationary fixed position or oscillating back and forth in a predetermined path. A sufficient amount of material, to provide a smooth surface to the oxide for further semiconductor processing, is removed by the polishing plate without removing an excessive amount of the underlying materials. Thus it is a well known problem that one must precisely detect the CMP end point.

Another application of CMP end point measurement is in the fabrication of multi-layer metal/insulator thin film structures where it is important to stop the CMP process upon the removal of the last unwanted layers of the metal or insulator.

It is well known to measure the end point of the CMP processing using "ex situ" measurement. Of course this has the drawback that first the wafer must be removed from the CMP machine, have its film thickness measured, and then be replaced on the CMP machine. This substantially reduces throughput and hence increases cost.

There are also known a number of methods for "in situ" measurement of the film thickness, i.e. when the wafer is still in the CMP machine. Such methods use for instance (1) audio detection, (2) measurement of a difficulty of polishing, (3) electrical current measuring methods, and others.

Lustig discloses an in situ method using a window embedded within the polishing table (polishing plate) whereby the window traverses a viewing path during polishing. This enables in situ viewing of the surface of the workpiece (wafer) from an underside of the polishing table during polishing, as the window traverses the detection region along the viewing path. A reflectance measurement device measures light reflection through the window on the underside of the polishing table. The reflectance measurement device provides a reflectance signal representative of an in situ reflectance of the film being measured. A change in the in situ reflectance signal corresponds to changes in conditions of the polishing process.

The present inventors have determined that a defect of Lustig's approach is that the observation window in the polishing pad may affect CMP process efficiency, since presumably there can be no polishing material over the location of the window. There is also a known in situ sensor using backside illumination, i.e. not through the polishing pad but from the opposite surface of the wafer; see Litvak et. al. U.S. Pat. No. 5,499,733. However this method only provides a single data point per measurement and is believed to suffer from poor detection sensitivity at certain film thicknesses.

Therefore there is an ongoing need for improved in situ sensing of thin film thicknesses during CMP, providing enhanced detection sensitivity over a wide range of film thicknesses.

SUMMARY

In accordance with this invention, the thickness (or thickness change) of a thin film formed on a surface of a wafer, for instance a silicon wafer, is measured when the wafer is face down on a polishing pad. In one embodiment, illumination is provided from the backside surface of the wafer, i.e. that surface which is facing away from the polishing pad. Alternatively, the illumination is from the frontside surface of the wafer. With backside illumination, the illumination passes through the wafer, through the thin film, is reflected from the surface of the thin film which is away from the wafer (and which is on the polishing pad) and back through the thin film, through the wafer to an optical detector. The detected optical signal is then converted to an electrical signal. In accordance with the invention the incidence angle of the incident illumination is varied. Typically the illumination is in the infrared, e.g. 1.1 $\mu$m wavelength or greater. As the incidence angle is changed during the measurement process, the reflected intensity of the light undergoes variations. The angle at which the reflected intensity is at a minimum is previously determined theoretically or experimentally. It can be determined theoretically or experimentally that as the thickness of the film changes, the position of the minimum intensity will also change. Thus this allows one to monitor the thickness of the film under test (or its thickness change) over a wide range of film thicknesses. This can be done during the CMP process to measure thickness changes, rather than absolute thickness. Hence there are numerous data points taken for each and every film thickness measurement so the data obtained represents for instance one half cycle of the thin film reflectance curve. In accordance with the invention different parts of the reflectance curve can be used to overcome the problem recognized by the present inventors of poor detection sensitivity at certain film thicknesses.

DETAILED DESCRIPTION

The present method and apparatus for detecting thin film thickness or thickness change during CMP use thin film reflectance variations caused by a change in the incidence angle of the incident light. In one embodiment where the thin film is formed on a silicon wafer, the wafer is illuminated from its backside, i.e. the side which does not have the thin film on it and which is away from the polishing pad surface, using an infrared source at a wave length of 1.1 μm or greater. Of course this particular wavelength and the other specific wavelengths, parameters and dimensions disclosed here are not limiting but merely illustrative of one embodiment of the invention. That is, the invention is generally applicable to measuring thicknesses of thin films formed on transparent substrates, and is not limited to the semiconductor CMP application which is the described embodiment.

When the angle of the incident (illumination) light is changed, the reflectance of the light (which passes through the wafer and the thin film reflects off the topside and bottomside surfaces of the thin film, and then passes back through the thin film and the wafer), undergoes variations as described further below. The angle at which reflective intensity is at a minimum (or maximum) is determined by the thin film interference light equation described below. As the thickness of the thin film changes, the position of the reflective intensity minimum (or maximum) in angle space also changes, thereby allowing determination of the actual thin film thickness.

Figure 1A:
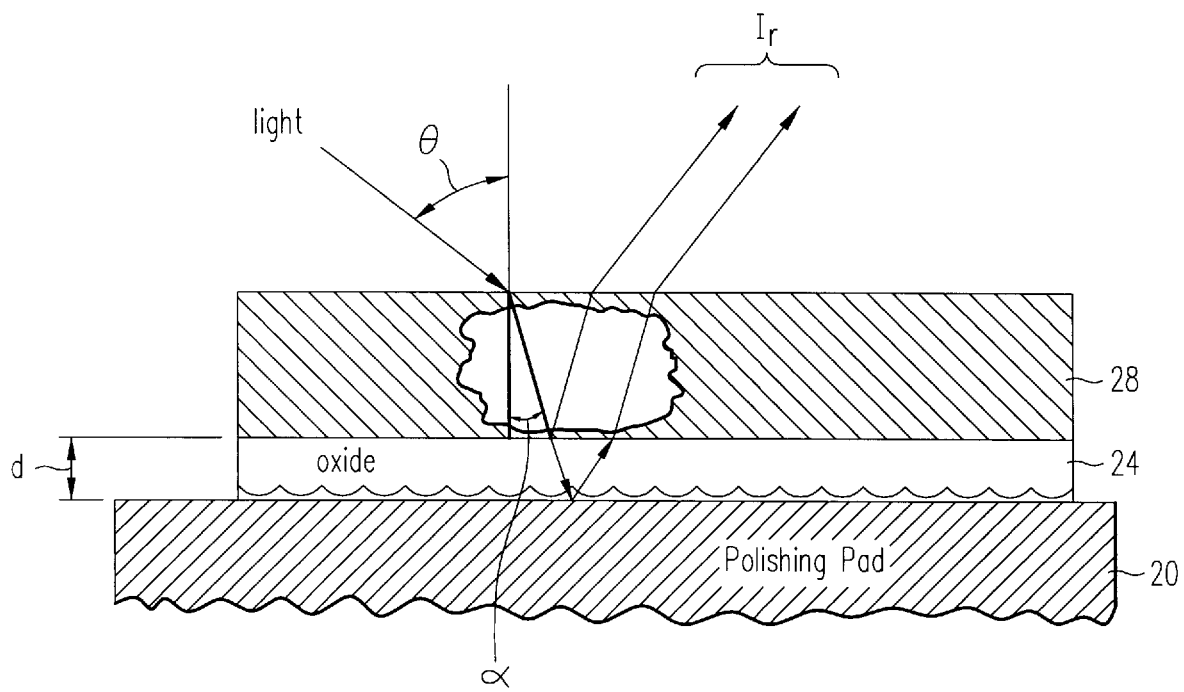
FIG. 1A shows in accordance with this invention a method for measuring thickness and thickness change of a film formed on a wafer from the backside of the wafer.
Figure 1B:
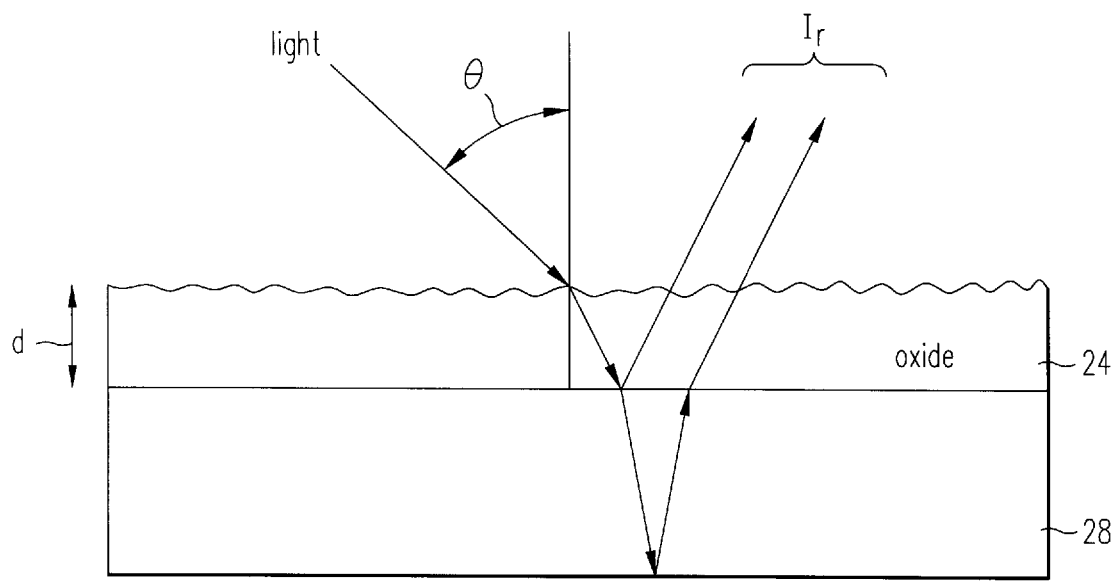
FIG. 1B shows the method of FIG. 1A with measuring from the frontside of the wafer.
Figure 4:
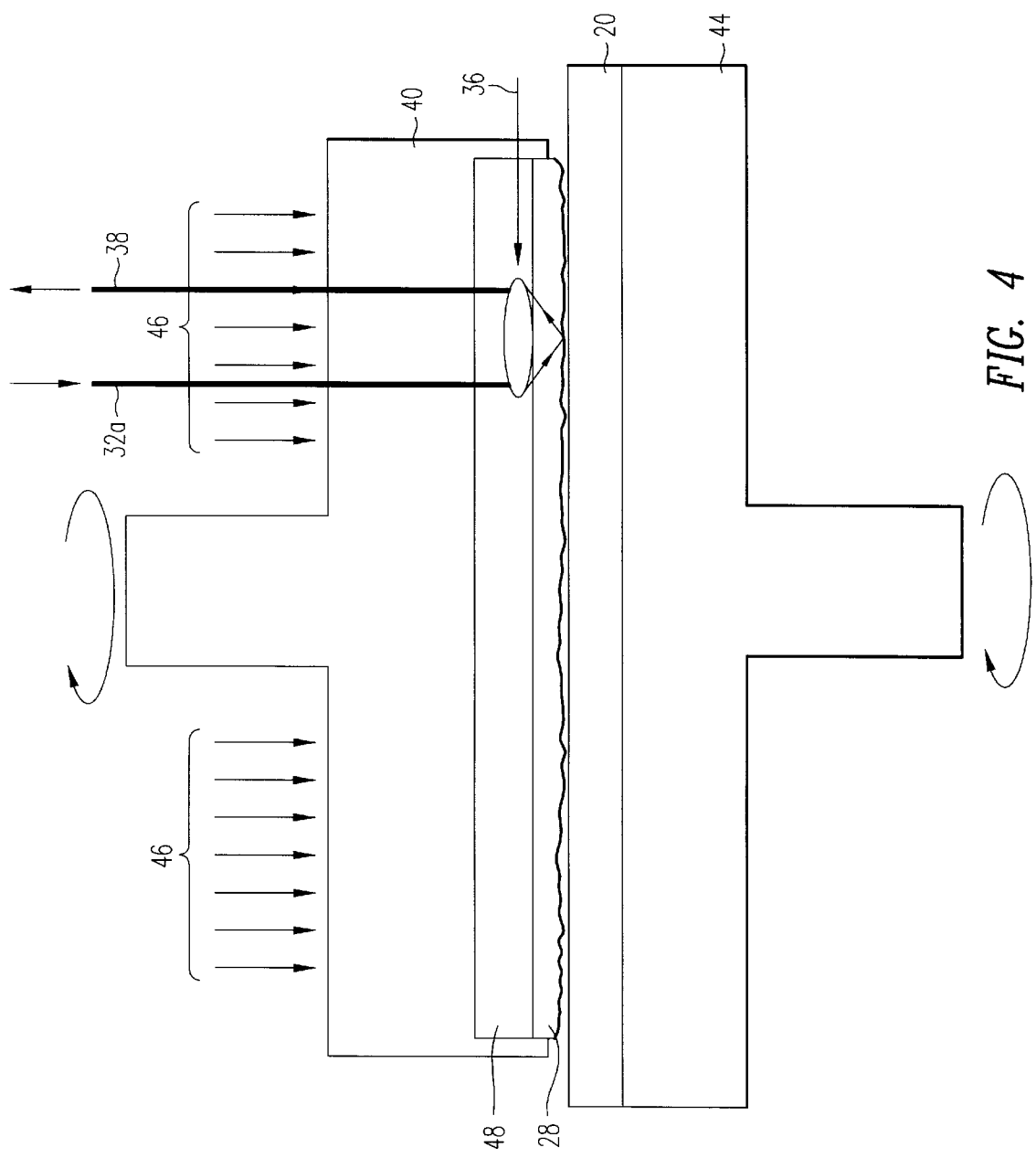
FIG. 4 shows a second embodiment of the sensor apparatus.

Referring to FIGS. 1B and 4, in accordance with the present invention and illustrated in cross section, a polishing pad 20 is supported by a platen 44 of a CMP machine. The workpiece illustrated is a silicon wafer 28 on which is formed a thin silicon dioxide film 24 on the surface of the wafer 28. (This figure is not to scale.) The lower rough surface (in the figure) of the silicon dioxide ("oxide") film 24 rests on the polishing pad 20 and is being polished by the polishing pad 20. It will be understood by those skilled in the art that elements of the conventional CMP process, such as the slurry for example, are not shown in the figures. The backside surface of the wafer 28 (the upper surface of wafer 28 in the figure) is held on a wafer carrier 40. The wafer carrier 40 defines passages for the incident and reflective light. The passages are e.g. voids, transparent windows, or optical fibers.

In this illustrative embodiment, wafer 28 is illuminated from its backside by an infrared source of illumination, in this example of 1.1 μm wavelength or greater. (If the wafer 28 as in FIG. 1B with film 24 is alternatively illuminated from its frontside, a different wavelength, for example, in the visible light spectrum is used.) The incident light is at an angle θ from the normal. This incident light, as shown, passes through the wafer 28, part of it is reflected at the wafer-oxide interface, and the other part passes through the oxide 24, is reflected from the rough surface of the oxide 24, back through the oxide 24, and back through the wafer 28. The combined intensity of the light reflected at the wafer-oxide interface and at the rough surface of the oxide 24 after transmission through the wafer 28 is designated $I_r$. In this case, the thickness of the oxide layer is d. The refractive index of the oxide is $n_f$ and the refractive index of the wafer 28 is $n_s$. $I_{dc}$ is the DC part of the reflected light signal and V is the fringe visibility. Then the total reflected light intensity $I_r = I_{dc} + V I_{dc} \cos[4\pi d (n_f^2 - n_s^2 \sin^2\alpha)^{1/2}/\lambda]$ where:

$$I_{dc} = \frac{I\min + I\max}{2} \text{ (mean intensity)}$$

$$V = \frac{I\max - I\min}{I\max + I\min} \text{ (visibility)}$$

and α is the refraction angle inside the wafer. This is the same as the incidence angle at the wafer-oxide interface. If the illumination is from the wafer frontside surface, the total reflected light intensity $I'_r = I'_{dc} + V I'_{dc} \cos[4\pi d (n_f^2 - n_{air}^2 \sin^2\theta_{air})^{1/2}/\lambda]$ where $n_{air}$ is the refractive index of air and $\theta_{air}$ is the angle of incidence of the light in air.

Figure 2A:
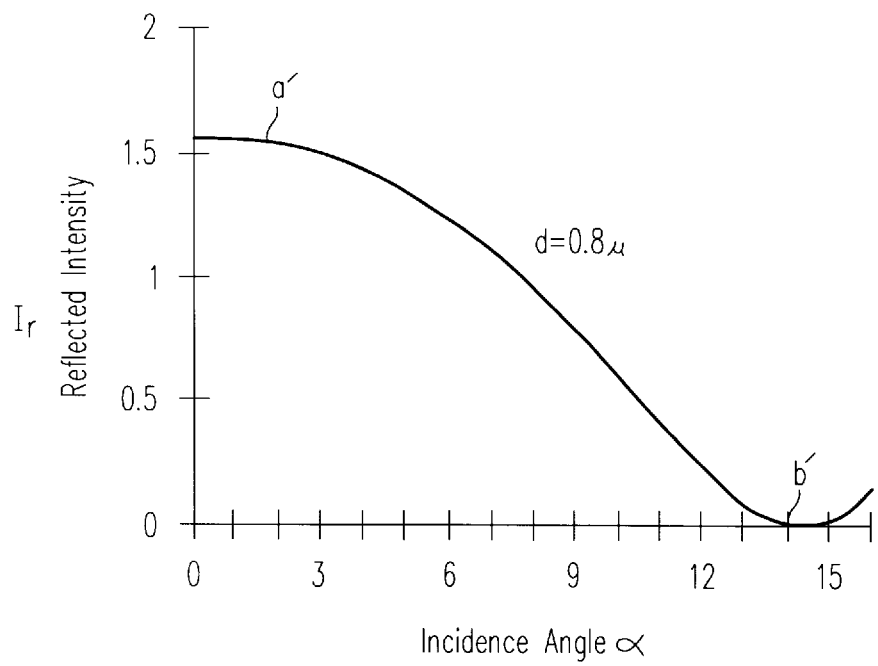
FIGS. 2A and 2B show variation of thin film reflectance with incidence angle for two different thin film thicknesses.
Figure 2B:
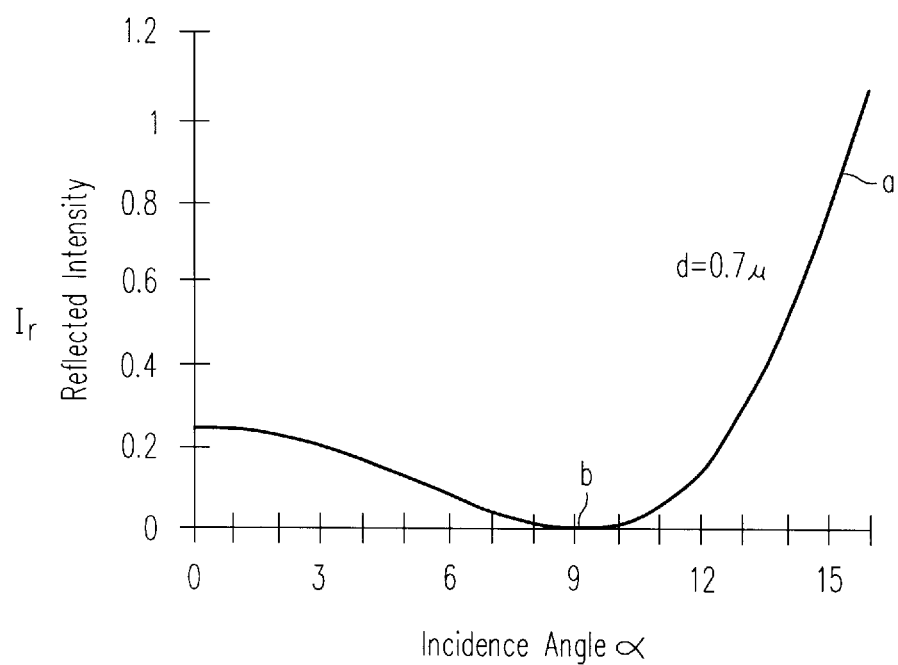

As it is well known from optics, when the angle α (or $\theta_{air}$) of incidence changes, the reflected intensity $I_r$ or $I'_r$ undergoes variation. This is used to measure the thickness of the oxide film 24. A plot of the reflected intensity $I_r$ (vertical axis) vs. the angle α of the incident illumination (horizontal axis) is shown in FIGS. 2A and 2B. In FIG. 2A the thickness d of the oxide is 0.8 μm; in FIG. 2B the thickness d of the oxide is 0.7 μm. This shows that there is a sharply different variation of the reflected intensity $I_r$ vs. the incidence angle α (in degrees) for even small differences in the thin film thickness. The key measurements used here are the data points b,b' at which the reflected intensity goes to zero i.e., the reflected intensity minimum. Alternatively, the maxima a, a' if observed, can also be used. The maxima and minima of course are determined by the thin film interference equation given above. Hence when the thickness of the oxide layer changes even slightly, the position in terms of the incidence angle α of the reflected intensity minima b,b' changes sharply. This provides a well defined measurement of the thin film thickness change. A similar result is provided for the frontside illumination embodiment.

Figure 3:
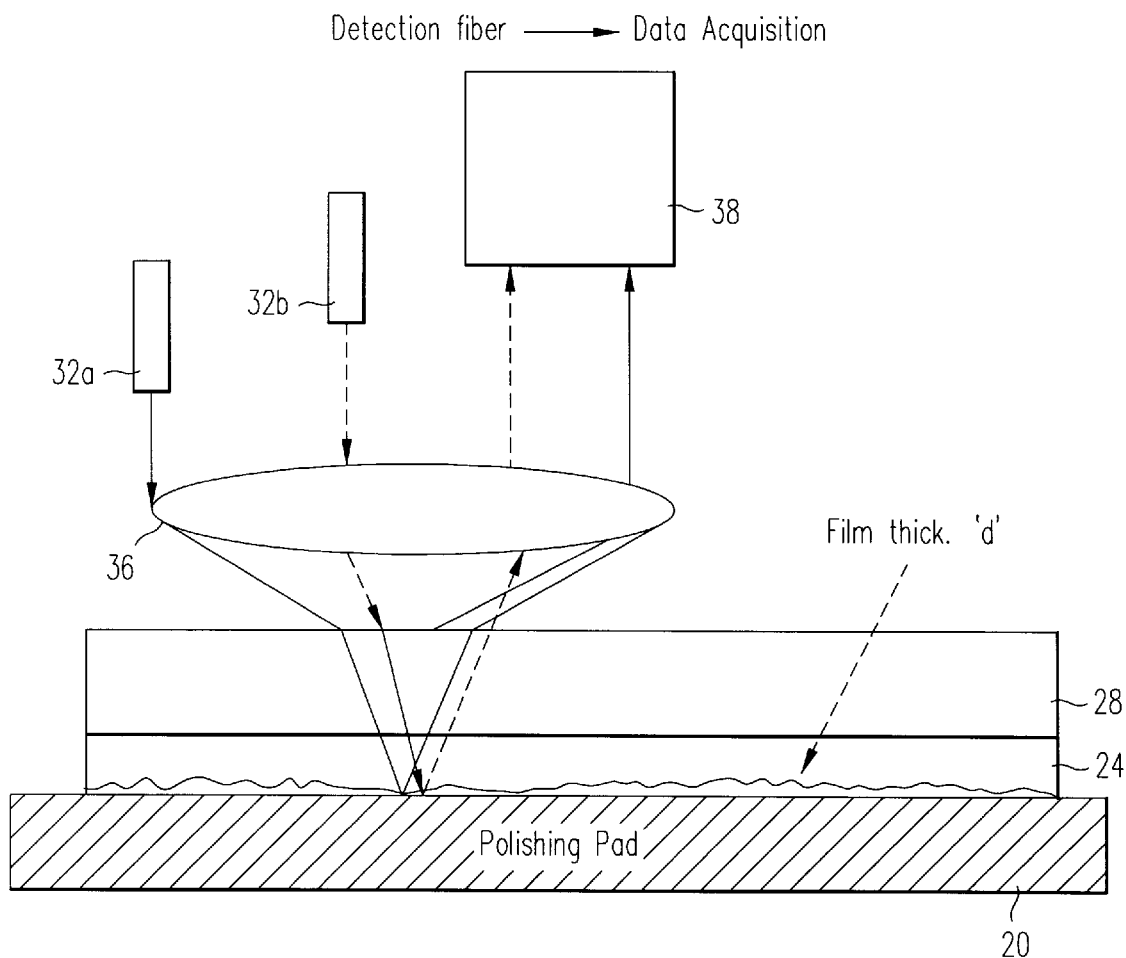
FIG. 3 shows a sensor apparatus in accordance with this invention.

An apparatus in accordance with the invention for the backside illumination embodiment is illustrated in FIG. 3; elements similar to those of FIG. 1A have identical reference numbers. The actual CMP machine is not shown except for the polishing pad, the remainder of the machine being conventional except for suitable passages in the wafer carrier for the incident and reflected light as described below. It is to be understood that this invention in one embodiment is a feature added to an otherwise conventional CMP machine. However, the present invention is not restricted to such an in situ application.

In this apparatus the illumination source is e.g. a laser diode (not shown) and its illumination passes through several illuminating optical fibers 32a, 32b located at spaced apart locations. In order to detect the reflected light intensity over a range of angles, there are a number of angularly spaced apart illumination fibers 32a, 32b and detection fibers 38, of which only one set are shown. The incident illumination from the fibers 32a and 32b passes through a suitable lens 36 and then passes through the wafer 28, is reflected from both surfaces of the thin film 24, and is reflected back through lens 36 to the detection optical fiber 38 which may be a number of optical fibers (or other detectors) located at various spaced apart locations. This detected light is then converted to an electrical signal, for instance by a photocell or photomultiplier tube, and is then processed to find local minima b,b' (or maxima a,a') as illustrated in FIGS. 2A and 2B.

FIG. 4 shown in cross section a more detailed embodiment of the present sensor apparatus; elements in FIG. 4 having the same reference numbers as in FIG. 3 have identical reference numbers. FIG. 4 shows additional portions of the CMP machine, including the platen 44 which rotates (arrow) for polishing and on which polishing pad 20 is mounted, and wafer carrier insert 48 mounted in wafer carrier 40, which also rotates (arrow). Downward force is exerted in the direction of arrows 46 during polishing. Fibers 32a, 38 extend through appropriate passages in wafer carrier 40 and carrier insert 48, and lens 36 (the "sensor head") is also mounted in insert 48. (Other illumination fibers e.g. 32b are not shown, for simplicity of illustration.)

The modifications to the depicted apparatus to adapt it for frontside illumination will be apparent to one of ordinary skill in the art.

Although the actual data acquisition system is not shown in FIGS. 3 or 4, in one embodiment it operates in accordance with the following equations. It is to be understood that in one embodiment this data acquisition is carried out by a properly programmed computer. Coding a program for such a computer in light of the following description would be well within the skill of one ordinary skill in the art. The data processing carried out by the data acquisition system (the computer in one embodiment) is as follows:

If the initial thickness of the thin film 24 is $d_1$, then $$2d_1(n_f^2 - n_s^2 \sin^2\alpha_0)^{1/2} = m_1\lambda \qquad (1)$$

where $n_f$ is the film 24 refractive index and $n_s$ is the wafer 28 refractive index at $\lambda$ (the light wavelength), $m_1$ is the interference fringe order, and $\alpha_0$ is the incidence angle at which an intensity maximum a' as in FIG. 2A is observed. (It is to be understood that the local maxima and minima of FIGS. 2A, 2B are caused by the interference effects.) If $\alpha_1$ is the incidence angle at which the adjacent intensity minimum b' occurs, then $d_1$ is also $$2d_1(n_f^2 - n_s^2 \sin^2\alpha_1)^{1/2} = (m_1 \pm 0.5)\lambda \qquad (2)$$

The value of $m_1$ is obtained from the following quadratic equation derived from equations (1) and (2):

$$m_1^2 \left[ 1 - \frac{n_f^2 - n_s^2\sin^2\alpha_1}{n_f^2 - n_s^2\sin^2\alpha_0} \right] \pm m_1 + 0.25 = 0 \qquad (3)$$

Once $m_1$ is known, initial film 24 thickness $d_1$ (before polishing) is determined either from equation (1) or (2).

Let $d_2$ be the film 24 thickness after polishing occurs. If the reflectance minimum occurs at angle of incidence $\alpha_2$, the new film 24 thickness is:

$$2d_2(n_f^2 - n_s^2 \sin^2\alpha_2)^{1/2} = (m_2 \pm 0.5)\lambda \qquad (4)$$

where $m_2$ is the interference fringe order corresponding to film 24 thickness $d_2$ and is determined by the same procedure as above.

From equations (2) and (4) $d_2$ is determined as:

$$d_2 = \left\{ d_1 \sqrt{n_f^2 - n_s^2\sin^2\alpha_1} - \frac{(m_1 - m_2)\lambda}{2} \right\} \frac{1}{\sqrt{n_f^2 - n_s^2\sin^2\alpha_2}} \qquad (5)$$

When one is dealing with only one film 24 layer, $d_2$ is the film 24 thickness after polishing. When dealing with multi-layer film, $(d_1 - d_2)$ is an indication of the change in the thickness of the "stack" of film layers and hence the change in the thickness of the film that is being polished.

When dealing with thickness change for which there is no fringe order change, equation (5) can be rewritten as:

$$d_2 = d_1 \sqrt{n_f^2 - n_s^2\sin^2\alpha_1} \; \frac{1}{\sqrt{n_f^2 - n_s^2\sin^2\alpha_2}} \qquad (6)$$

Thus using the present thin film thickness sensor and method, one can obtain in real time (while polishing) a measurement of thin film thickness changes, hence increasing efficiency of the overall CMP process and thereby reducing processing costs.

It is to be understood that the present disclosure is illustrative and not limiting; further modifications will be apparent to one skilled in the art and are intended to fall within the scope of the appended claims.

What is claimed is:

1. A method of measuring a thickness or thickness change of a film formed on a principal surface of a substrate, comprising the steps of:

illuminating the substrate and film;

detecting a total intensity of the illumination reflected from the substrate and film;

measuring the total reflected illumination intensity at each of a plurality of incidence angles, and determining an incidence angle at which the total reflected illumination intensity is at a minimum or maximum, thereby to determine the thickness or thickness change of the film.

2. The method of claim 1, wherein the illumination is initially incident on a backside surface of the substrate, the film being formed on an opposing surface of the substrate.

3. The method of claim 2, wherein the substrate is supported on a polishing pad and the illumination does not pass through the polishing pad.

4. The method of claim 1, wherein the illumination is initially incident on a surface of the film and then passes through the film to the substrate.

5. The method of claim 1, wherein the illumination is initially incident on a surface of the substrate and then passes through the substrate to the film.

6. The method of claim 1, wherein a change of the film thickness detected by:

measuring a relative thickness of the film;

reducing the thickness of the film; and measuring the relative thickness of the film after the step of reducing.

7. The method of claim 6, wherein the step of reducing includes chemical mechanical polishing.

8. The method of claim 1, wherein the minimum or maximum is for a particular fringe order of the reflected illumination.

9. The method of claim 1, wherein the substrate is a crystalline silicon wafer.

10. The method of claim 1, wherein a wavelength of the illumination is equal to or greater than 1.1 $\mu$m.

11. The method of claim 1, further comprising the steps of placing the surface of the substrate on which the film is formed on a polishing pad prior to the steps of illuminating and detecting.

12. The method of claim 1, wherein in the step of measuring, the plurality of incidence angles is between a local minimum and a local maximum of a reflectance curve of the film.

13. The method of claim 1, wherein the minimum and maximum are respectively a local minimum and a local maximum.

14. An apparatus for measuring a thickness or thickness change of a film formed on a principal surface of a transparent substrate, comprising:

a polishing pad for supporting the substrate, the film resting on the polishing pad;

a source of illumination located to illuminate the film and the substrate; and a detector located to detect a total intensity of illumination reflected from the film and the substrate, at each of a plurality of angles of reflection.

15. The apparatus of claim 14, wherein the source of illumination is located to initially illuminate a backside surface of the substrate, the film being on an opposing surface of the substrate.

16. The apparatus of claim 15, wherein the illumination does not pass through the polishing pad.

17. The apparatus of claim 14, wherein the source of visible illumination is located to initially illuminate a surface of the film and the illumination then passes through the film to the substrate.

18. The apparatus of claim 14, wherein the detector includes means for determining an absolute thickness of the film.

19. The apparatus of claim 14, wherein the detector include means for determining a change in a thickness of the film over time.

20. The apparatus of claim 14, wherein the maximum or minimum is for a particular fringe order of the reflected illumination.

21. The apparatus of claim 14, wherein a wavelength of the illumination from the source is equal to or greater than 1.1 $\mu$m.

22. The apparatus of claim 14, wherein a wavelength of the illumination from the source is in the visible light spectrum.

23. The apparatus of claim 14, wherein the plurality of angles are between a local minimum and a local maximum of a reflectance curve of the film.

24. The apparatus of claim 14, further comprising a carrier for holding the substrate, wherein the carrier defines passages for the illumination illuminating and reflected from the film and the substrate.

25. The apparatus of claim 24, wherein an optical fiber extends through each passage.

26. The apparatus of claim 14, wherein the minimum and maximum and respectively a local minimum and a local maximum.

* * * * *